(12) United States Patent
Hofmann et al.

(10) Patent No.: US 6,392,520 B1
(45) Date of Patent: *May 21, 2002

(54) CURRENT COIL

(75) Inventors: Karl Hofmann, Remseck; Martin Hafner, Leonberg; Roland Zucker, Sachsenheim, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/486,046

(22) PCT Filed: Jun. 8, 1999

(86) PCT No.: PCT/DE99/01662

§ 371 Date: May 15, 2000

§ 102(e) Date: May 15, 2000

(87) PCT Pub. No.: WO99/67600

PCT Pub. Date: Dec. 29, 1999

(30) Foreign Application Priority Data

Jun. 19, 1998 (DE) .................................... 298 10 989 U

(51) Int. Cl.⁷ ............................................ H01F 27/29
(52) U.S. Cl. ..................................... 336/107; 336/192
(58) Field of Search ............................... 336/107, 192; 439/449–457, 460; 239/585.4

(56) References Cited

U.S. PATENT DOCUMENTS 2,192,165 A * 2/1940 Caldwell .................... 439/449

* cited by examiner

Primary Examiner—Lincoln Donovan
Assistant Examiner—Tuyen T. Nguyen
(74) Attorney, Agent, or Firm—Ronald E. Greigg

(57) ABSTRACT

A current coil for use in a needle motion sensor for a fuel injection valve, having a coil body, which is provided with a metallic coil core, wherein connecting contact wires for the coil winding are held pressed against the coil body in formed grooves of the coil body.

9 Claims, 2 Drawing Sheets

CURRENT COIL

PRIOR ART

The invention is based on a current coil, for use in a needle motion sensor for fuel injection valves. In a current coil of this type, which is known from WO 90/06439, a cylindrical coil body is inserted into a corresponding receiving opening of a valve holding body of a fuel injection valve and acts as a needle motion sensor there for detecting the motion of an axially movable valve needle of the fuel injection valve. For this purpose, the end of the coil body oriented toward the valve needle has a metallic coil core inserted into it, which is coaxially encompassed by a coil winding that is mounted onto the coil core. The ends of the coil winding wire are each connected to a respective connecting contact wire which on the other end, has connections for external electric connecting lines. In the known current coil, a wire-guiding body is also provided which is slid onto the connecting contact wires on the coil body and therefore fixes them in position.

The known current coil, however, has the disadvantage that after the coil wire has been wound, the winding wire beginning and the winding wire end must be placed with a tension relief loop against the ends of the connecting contact wires and soldered there. This soldering process therefore requires manual labor that is expensive for technical manufacturing reasons and cannot be automated. Furthermore, the known current coil has the disadvantage that the windings and tension relief loops at the connections can easily shift during transport and installation of the current coil so that the current coil can be easily damaged, which requires more care to be exercised in the transport and installation of the current coil into the needle motion sensor.

ADVANTAGES OF THE INVENTION

The current coil according to the invention, has an advantage over the prior art that the current coil can be automatically produced, automatically soldered, and then can be additionally extrusion coated so that all of the wires and windings are fixed in such a way that they can no longer move or be damaged during transport of the current coils or their installation into a needle motion sensor. The coil body of the current coil according to the invention has been provided with a particular wire guide, preferably the form of a formed groove, which permits the connecting contact wires that are preferably embodied as formed wire to be pressed into this formed groove. Due to the shaping of the formed groove, preferably as a groove profile, permits the connecting contact wire can be fixed immediately upon insertion into the formed groove. The shape of the connecting contact wire thereby produces a secure fixing in all directions and permits high securing forces to be achieved. The connecting contact wires are each provided with a tension relief loop and are inserted into the formed groove, which preferably is embedded completely in the coil body and permits a length compensation of the connecting contact wire. Another tension relief loop is advantageously provided at the ends of the coil winding wire before it is fastened to the connecting contact wire. These ends of the coil winding wire are advantageously guided to fixing lugs of the coil body. The connecting section between the ends of the coil winding wire to the connecting contact wires takes place by their being guided in a corresponding groove that extends obliquely to the axis of the coil body. In order to completely fix the wires in position and to secure them against an unintended movement, the coil body is also encompassed with a plastic material, preferably a hot glue.

In a particularly advantageous manner, the current coil according to the invention can be produced in an automated fashion. The connecting contact wires, which are embodied as formed wires, are first pressed into the corresponding formed grooves on the coil body with a tension relief loop and with radially protruding wire ends. In another process step, the coil wire is then automatically wound, wherein the coil wire beginning and the coil wire end are wound by the winding machine onto the radially protruding ends of the connecting contact wires. In another process step, the two wire ends are preferably soldered to each other in a solder bath. Then the connecting contact wire ends are bent inward toward the coil body. This produces the relief loops at the ends of the coil winding wire, which are each aligned with a fixing lug and are fixed. In another work step, the current coil is then completely extrusion coated with a plastic material, preferably hot glue.

This new manufacturing process for current coils has the advantage that the manufacturing process, which can now be automated, can achieve a degree of high manufacturing reliability. Furthermore, in particular the soldering process by means of immersion is especially advantageous. The additional extrusion coating of the current coil with a plastic also produces a high degree of security against unintentional changes to the winding wire position during transport or installation of the current coil. In addition, the closed plastic cover offers an additional protection of the coil region and the soldering points from damaging environmental influences.

Other advantages and advantageous embodiments of the subject of the invention can be inferred the from the drawings, the description, and the claims.

BRIEF DESCRIPTION OF THE DRAWINGS

An exemplary embodiment of the current coil according to the invention is shown in the drawings and will be described in detail in the description that follows.

DESCRIPTION OF THE EXEMPLARY EMBODIMENT

Figure 1:
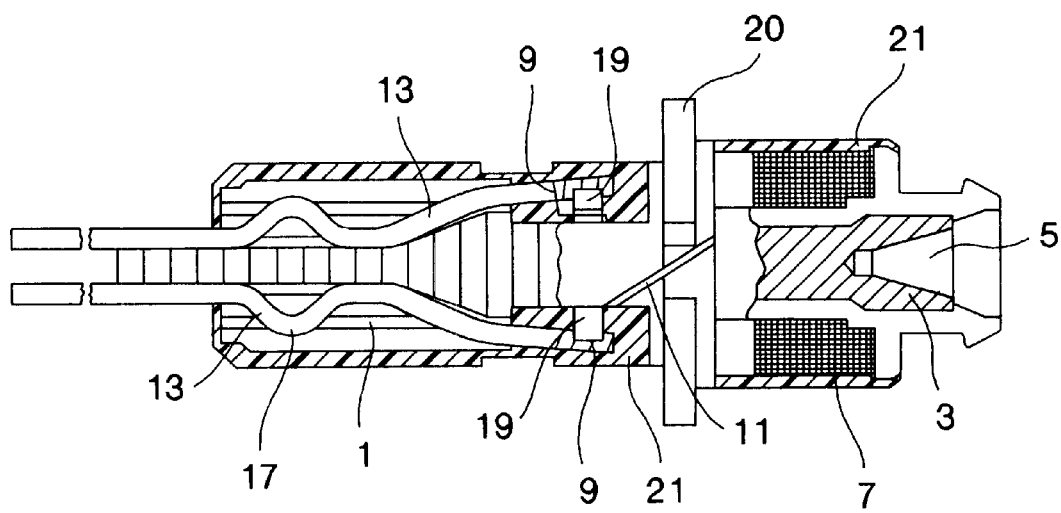
FIG. 1 is a complete sectional depiction of the current coil.
Figure 2:
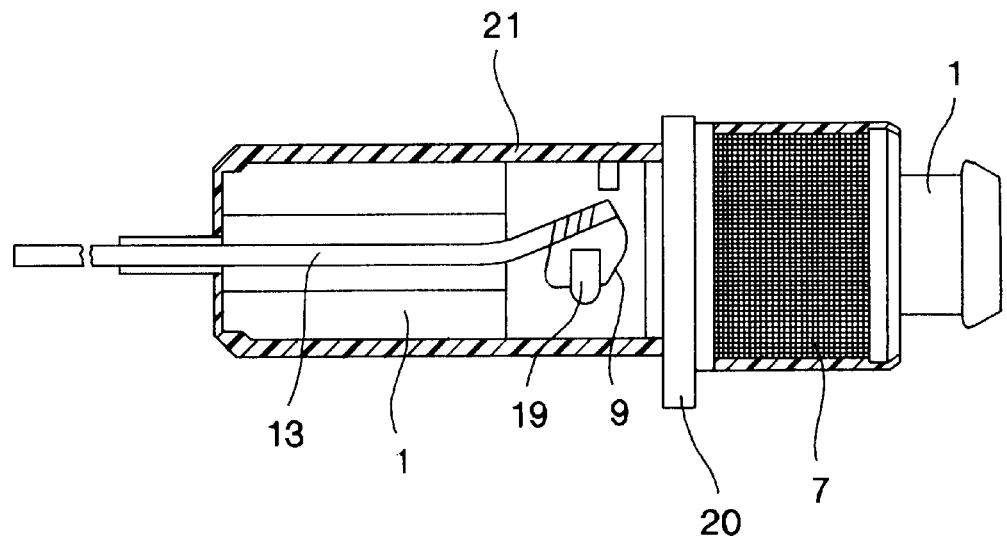
FIG. 2 is a view that is rotated by 90° in relation to FIG. 1.

FIGS. 1 to 5 show different views and manufacturing stages of an exemplary embodiment of the current coil according to the invention. First of all, the current coil according to the invention, which is shown completely in FIGS. 1 and 2, has a cylindrical coil body 1 made of plastic. This coil body is embodied of two parts and has a core part and a cover part that encompasses the core part. A metallic coil core 3 is inserted into one end of the coil body 1 and on an outer end, has a conical opening 5 which transitions into a conical opening on the coil body 1; a bolt-shaped magnet armature of the axially movable valve member (valve needle) of the fuel injection valve protrudes into this conical opening when the current coil is in its installed position. Furthermore, at the level of the metallic coil core 3, a coil winding 7 is mounted onto the coil body 1 coaxial to the coil core 3. The ends 9 of the coil winding wire of the coil winding 7, forming a tension relief loop by way of an oblique groove 11 in the coil body 1, are each connected to an end of a connecting contact wire 13. These connecting contact wires 13 are respectively pressed into a groove 15, formed with a wavy shape, (see FIG. 3) provided in the coil body 1, wherein a tension relief loop 17 is provided on each of the connecting contact wires 13 and is completely embedded in the cover of the coil body 1. On their ends remote from the coil winding 7, the connecting contact wires 13 protrude axially from the coil body 1 and consequently constitute an electrical contact point for a separate electric connecting line. For a better guidance and fixing of the loop ends 9 of the coil winding wire of the coil winding 7, fixing lugs 19 are also provided on the coil body 1, which secure the wire ends 9 in position. Furthermore, the coil body 1 has a radially protruding annular flange 20 with which the coil body 1 is fixed to the fuel injection valve in a receiving bore of the valve holding body. For the reliable position fixing of the coil winding wire and the connecting contact wires 13, the coil body 1 is also covered on its radial circumference surface by a plastic material, preferably a hot glue 21, which encloses all of the wire components and contact points of the current coil with the exception of the connecting points of the connecting contact wires 13.

Figure 3:
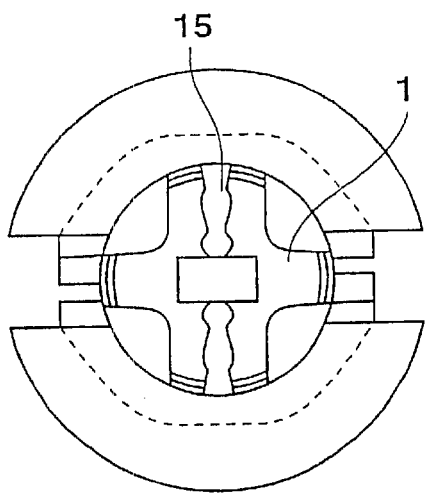
FIG. 3 is a front view of the coil body with formed grooves disposed in the coil body.
Figure 4:
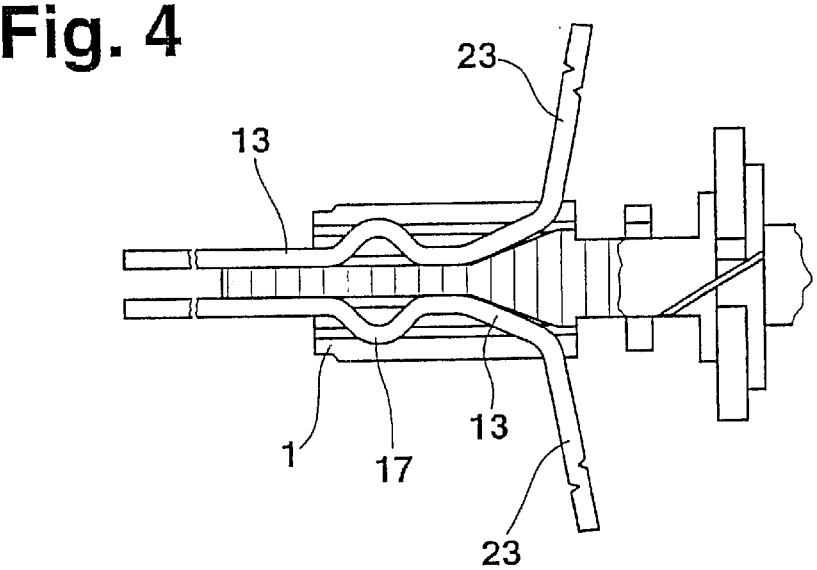
FIGS. 4 and 5 show partial sectional views of the current coil during different manufacturing stages.
Figure 5:
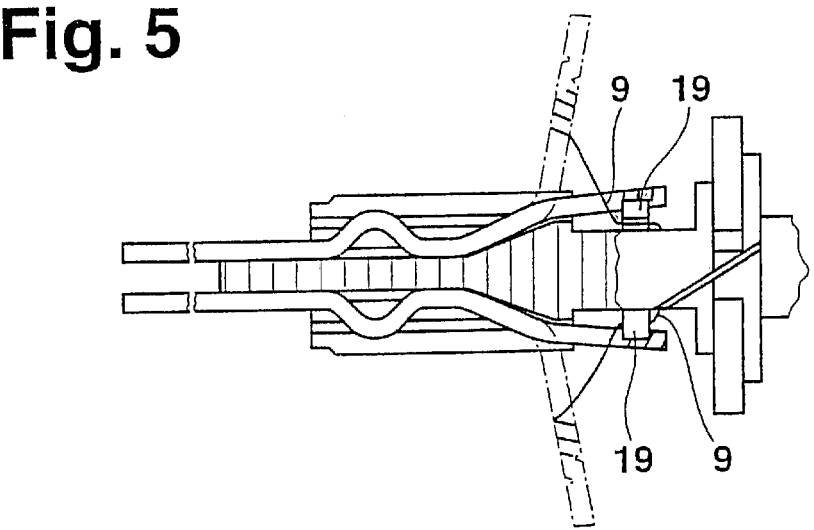

The process according to the invention for producing the current coil according to the invention will now be explained in detail with the aid of the partial sectional depictions of FIGS. 3 to 5. First, the connecting contact wires 13, which are embodied as formed wires, are pressed into the corresponding formed grooves 15 of the coil body 1, wherein a tension relief loop 17 is provided. The wire ends 23 of the connecting contact wires 13 oriented toward the coil winding 7 thereby initially protrude radially from the coil body 1. In another work step, the coil wire is then wound onto the coil body 1 to produce the coil winding 7. Then the ends 9 of the coil winding wire 7 are each fastened to a protruding end 23 of the connecting contact wires 13. In another work step, these wire contact points between coil winding wire ends 9 and connecting contact wire ends 23 are soldered to each other, preferably in a solder bath. Then, the protruding wire ends 23 are correspondingly shortened and are bent radially inward in the direction of the coil body 1. This bending inward produces the tension relief loops of the coil winding wire ends 9, which are then fixed in position on the fixing lugs 19. In a last work step, the wire-guiding regions of the current coil are completely extrusion coated with a plastic, preferably a hot glue.

The current coil according to the invention is used to detect the axial motion of a valve needle of a fuel injection valve but can alternatively also be employed for other typical uses.

foregoing relates to a preferred exemplary embodiments of the invention, it being understood that other variants and embodiments thereof are possible within the spirit and scope of the invention, the latter being defined by the appended claims.

We claim:

1. A current coil for a needle motion sensor for fuel injection valves, said current coil being connectable to electric connecting lines, said current coil comprising:

an elongated cylindrical coil body (1) having an axis, a metallic coil core (3) inserted into one end of said coil body, a coil winding (7) mounted on the coil body (1), the coil winding extending along the axis of the coil body a sufficient extent to encompass at least a major portion of the coil core (3), said coil winding including a coil winding wire having first and second ends (9) which are each connected with respective first and second connecting contact wires (13), each of said connecting contact wires being made of a formed wire which is different from the coil winding wire, and each being connectable to one of the electric connecting lines, the connecting contact wires (13) are each pressed into a formed groove (15) provided on the coil body (1), and in which a tension relief loop (17) is provided in each of the connecting contact wires (13), each said tension relief loop is completely disposed inside the coil body (1) and provides a length compensation on the connecting contact wire (13).

2. The current coil according to claim 1, in which the coil winding wire has a tension relief loop on said first and second ends (9) connected to the connecting contact wires (13).

3. The current coil according to claim 1, in which the coil body (91) has obliquely extending guide grooves (11), in which the first and second ends (9) of the coil winding wire are placed to guide them towards the connecting contact wires (13).

4. A current coil according to claim 1, in which at least in a vicinity of the connecting contact wires (13) and the coil winding wire, the coil body (1) is enclosed on its radial circumferential surface by a plastic material.

5. A process for producing a current coil according to claim 1, by the following process steps:

pressing the connecting contact wires (13), which are embodied as formed wires into corresponding formed grooves (15) on the coil body (1), with a provision of a relief loop (17) and with radially protruding wire ends (23), winding he coil wire (7) onto the coil body (1), with the ends (9) of the coil winding wire each fastened to a protruding end (23) of the connecting contact wires (13), soldering the wire contact points between coil winding wire ends (9) and connecting contact wire ends (23), bending the protruding wire ends (23) of the connecting contact wires (13) in a direction of the coil body (1), and extrusion coating the wire-guiding regions of the current coil with a plastic material.

6. A current coil according to claim 3, in which the coil body (1) is molded as a single element, with the oblique grooves (11) molded therein.

7. A current coil according to claim 1, in which the coil body (1) includes shaped grooves (15) which accept and hold the connecting contact wires (15), including the relief loops (17).

8. A current coil according to claim 7, in which the shaped grooves (15) are formed with a wavy shape to help hold the connecting contact wires in place.

9. A current coil according to claim 7, in which the coil body (1) includes fixing lugs (19) which help secure the first and second ends of coil winding wire (9) in place.

* * * * *